United States Patent
Ansari et al.

(10) Patent No.: US 11,335,084 B2
(45) Date of Patent: May 17, 2022

(54) IMAGE OBJECT ANOMALY DETECTION

(71) Applicant: International Business Machines Corporation, Armonk, NY (US)

(72) Inventors: Ghulam Ahmed Ansari, Bangalore (IN); Amrita Saha, Bangalore (IN); Srikanth Govindaraj Tamilselvam, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 147 days.

(21) Appl. No.: 16/575,067

(22) Filed: Sep. 18, 2019

(65) Prior Publication Data

US 2021/0081727 A1    Mar. 18, 2021

(51) Int. Cl.
*G06V 10/70* (2022.01)
*G06T 7/70* (2017.01)
*G06K 9/62* (2022.01)
*G06T 7/90* (2017.01)
*G06T 7/62* (2017.01)
*G06T 11/20* (2006.01)

(52) U.S. Cl.
CPC ......... *G06V 10/768* (2022.01); *G06K 9/6215* (2013.01); *G06T 7/62* (2017.01); *G06T 7/70* (2017.01); *G06T 7/90* (2017.01); *G06T 11/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,268,998 | A | * | 12/1993 | Simpson ................ G06T 17/00 345/419 |
| 6,304,671 | B1 | | 10/2001 | Kakutani |
| 6,995,762 | B1 | * | 2/2006 | Pavlidis ................... G06T 7/50 348/46 |
| 7,187,810 | B2 | | 3/2007 | Clune et al. |
| 8,558,872 | B1 | * | 10/2013 | Cho ........................ G06T 11/00 348/43 |
| 8,780,223 | B2 | * | 7/2014 | Beauchemin ........... G06T 7/001 348/222.1 |
| 8,823,774 | B2 | * | 9/2014 | Cho ...................... G06F 3/0304 348/43 |
| 9,081,490 | B2 | * | 7/2015 | Bourgault ............... G06F 9/451 |
| 9,104,942 | B2 | * | 8/2015 | Wu ..................... G06V 30/413 |

(Continued)

FOREIGN PATENT DOCUMENTS

CN    102436660 A      5/2012
CN    106204566 A  * 12/2016 ........... G09B 29/004

OTHER PUBLICATIONS

Karima et al "From Paper Drawings to Computer-Aided Design" (Year: 1985).*

*Primary Examiner* — Tsung Yin Tsai
(74) *Attorney, Agent, or Firm* — Ference & Associates LLC

(57) ABSTRACT

One embodiment provides a method, including: receiving, at an information handling device, drawing input; identifying, using a processor, at least one object in the drawing input; determining, based on the identifying, whether a factual anomaly exists in the drawing input with respect to the at least one object; and notifying, responsive to determining that a factual anomaly exists, a user of the factual anomaly.

19 Claims, 5 Drawing Sheets

(56) References Cited

U.S. PATENT DOCUMENTS

| | | | |
|---|---|---|---|
| 9,542,722 B2* | 1/2017 | Gharavi-Alkhansari | G06T 7/50 |
| 9,799,118 B2* | 10/2017 | Komatsu | G06T 7/536 |
| 9,998,724 B2* | 6/2018 | Mizuo | H04N 13/128 |
| 10,127,662 B1* | 11/2018 | Reicher | G06T 7/30 |
| 10,198,846 B2* | 2/2019 | Carr | G06T 13/80 |
| 2003/0009315 A1* | 1/2003 | Thomas | G06F 30/00 703/1 |
| 2005/0209983 A1* | 9/2005 | MacPherson | G06T 11/206 |
| 2007/0028285 A1 | 2/2007 | Diederiks | |
| 2009/0096938 A1 | 4/2009 | Ouchi | |
| 2009/0174703 A1* | 7/2009 | Hermanson | G06T 13/60 345/473 |
| 2010/0225666 A1* | 9/2010 | Beauchemin | G06F 17/00 345/629 |
| 2012/0113117 A1* | 5/2012 | Nakayama | G06T 7/593 345/420 |
| 2012/0141032 A1* | 6/2012 | Ouyang | G06V 30/422 382/187 |
| 2012/0249820 A1* | 10/2012 | Beauchemin | G06T 7/001 348/222.1 |
| 2013/0060860 A1 | 3/2013 | Myslinski | |
| 2013/0151240 A1* | 6/2013 | Myslinski | G06Q 30/02 704/9 |
| 2013/0304604 A1* | 11/2013 | Hoffman | G06Q 30/0621 705/26.5 |
| 2013/0338960 A1* | 12/2013 | Bourgault | G06F 9/44505 345/173 |
| 2014/0022345 A1* | 1/2014 | Cho | G06T 11/00 348/43 |
| 2014/0169677 A1* | 6/2014 | Wu | G06V 40/168 382/190 |
| 2015/0131913 A1* | 5/2015 | Anderson | G06V 10/75 382/203 |
| 2015/0139534 A1* | 5/2015 | Komatsu | G06T 7/593 382/154 |
| 2016/0171749 A1* | 6/2016 | Mizuo | H04N 19/597 348/46 |
| 2016/0189342 A1* | 6/2016 | Gharavi-Alkhansari | G06T 3/40 345/660 |
| 2016/0239496 A1 | 8/2016 | Motte et al. | |
| 2017/0090730 A1* | 3/2017 | Knodt | G06T 7/62 |
| 2018/0234612 A1* | 8/2018 | Kunkel | H04N 5/04 |
| 2021/0081727 A1* | 3/2021 | Ansari | G06T 7/62 |

* cited by examiner

IMAGE OBJECT ANOMALY DETECTION

BACKGROUND

Situations often arise where users are prompted to create a physical drawing or painting (e.g., on a canvas, etc.) or to provide drawing input to a device (e.g., laptop or personal computer, smart phone, tablet, etc.). For example, a user may be a student in an art class and may be instructed to create a specific scene. To facilitate the creation of the scene, a user may utilize one or more markers or brushes (e.g., in the case of the physical drawing, etc.) or may utilize an input tool, such as their finger or a stylus (e.g., in the case of a digital drawing, etc.). The scene may contain one or more different objects, each of which may have a plurality of different attributes (e.g., size, color, position, etc.).

BRIEF SUMMARY

In summary, one aspect of the invention provides a method, comprising: receiving, at an information handling device, drawing input; identifying, using a processor, at least one object in the drawing input; determining, based on the identifying, whether a factual anomaly exists in the drawing input with respect to the at least one object; and notifying, responsive to determining that a factual anomaly exists, a user of the factual anomaly.

Another aspect of the invention provides an apparatus, comprising: at least one processor; and a computer readable storage medium having computer readable program code embodied therewith and executable by the at least one processor, the computer readable program code comprising: computer readable program code configured to receive drawing input; computer readable program code configured to identify at least one object in the drawing input; computer readable program code configured to determine, based on the identifying, whether a factual anomaly exists in the drawing input with respect to the at least one object; and computer readable program code configured to notify, responsive to determining that a factual anomaly exists, a user of the factual anomaly.

An additional aspect of the invention provides a computer program product, comprising: a computer readable storage medium having computer readable program code embodied therewith, the computer readable program code executable by a processor and comprising: computer readable program code configured to receive drawing input; computer readable program code configured to identify at least one object in the drawing input; computer readable program code configured to determine, based on the identifying, whether a factual anomaly exists in the drawing input with respect to the at least one object; and computer readable program code configured to notify, responsive to determining that a factual anomaly exists, a user of the factual anomaly.

A further aspect of the invention provides a method, comprising: providing, to a user and using an information handling device, an instructional prompt to create a drawing, wherein the instructional prompt specifies at least one object to be included in the drawing and at least one attribute associated with the at least one object; receiving, at the information handling device and responsive to the providing, drawing input from the user; determining, using a processor, whether a factual anomaly exists in the drawing input, wherein the determining comprises determining whether the drawing input contains the at least one object and whether the at least one object comprises the at least one attribute; automatically adjusting, responsive to determining that a factual anomaly exists, the drawing input to a factually correct drawing; and presenting the automatically adjusted drawing input to the user.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
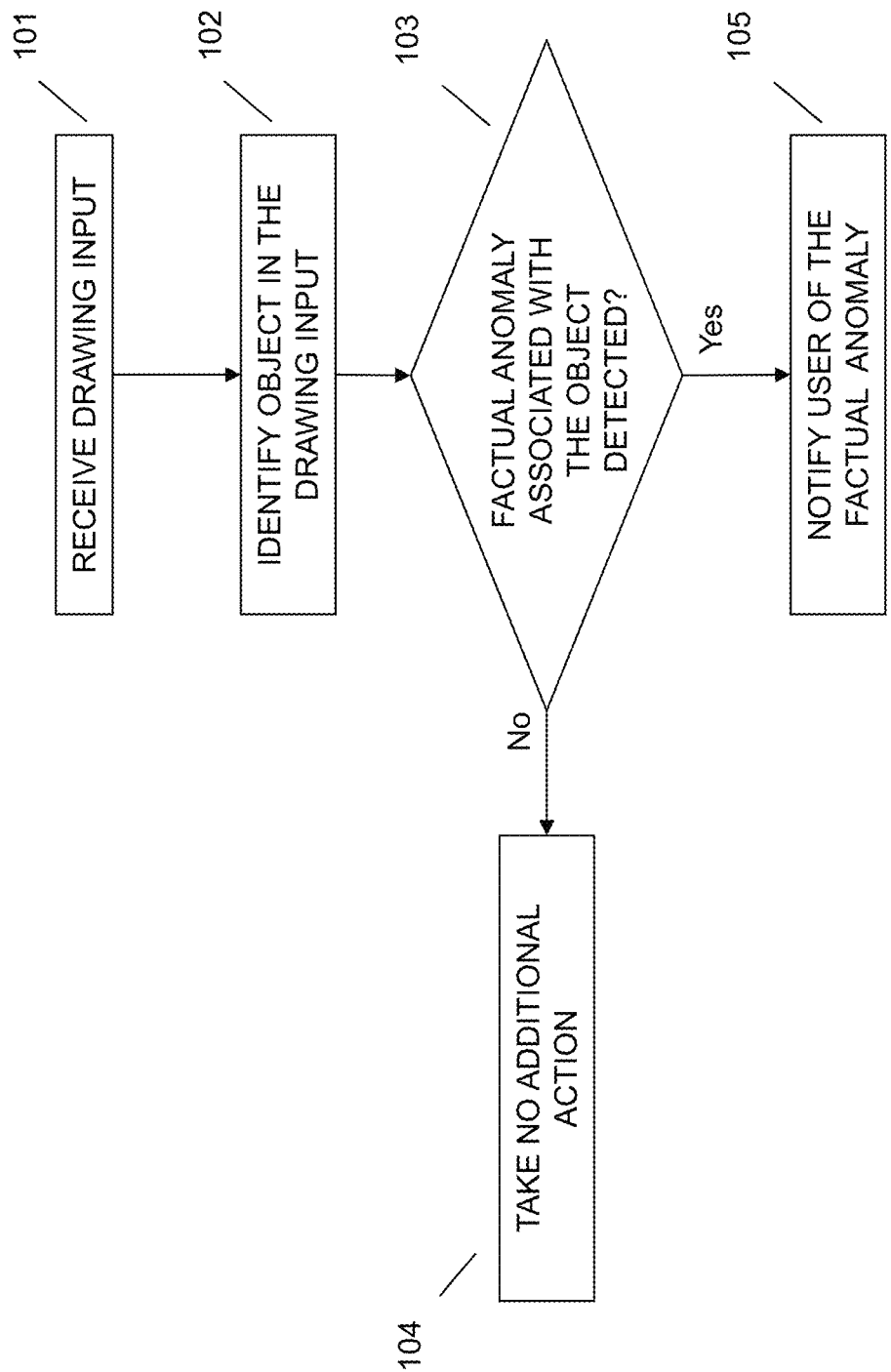
FIG. 1 illustrates a method of generating a conversational agent using a conversational agent workspace that provides suggestions for generating a conversational specification generated from a plurality of conversational logs.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

Presently, review and critique of a user drawn image is conducted manually. More particularly, as an example, a human instructor is generally responsible for reviewing their student's drawing and providing feedback on any issues present within the drawing. Common issues may involve the size, position, color, etc. of objects in the drawing with respect to other objects in the drawing. Any identified issues may thereafter be communicated to the drawer by the instructor. Additionally or alternatively, the instructor may redraw the image themselves to show the drawer the correct way to form the objects at issue.

It is oftentimes the case that an instructor does not have time to adequately review their student's drawing. For instance, it is not uncommon for the students in a classroom to drastically outnumber the instructor. In these situations, a single human instructor cannot thoroughly inspect and critique each student's drawing within a reasonable timeframe. As classrooms are steadily increasing in size (e.g., due to a lack of in-person instructors, due to the advent of online classrooms that are easier to attend, etc.), instructors may be less and less able to provide useful and relevant constructive feedback for each student.

Accordingly, the systems and techniques as described herein provide a system and technique for utilizing an artificial instructor (e.g., a digital assistant, etc.) to analyze and critique drawing input. The system may first receive or detect drawing input. The system may then identify an object in the drawing input and determine whether a factual anomaly exists with respect to another object in the drawing input. For example, the system may determine that a particular object is drawn too big compared to other objects around it to satisfy a realistic context. Responsive to determining that a factual anomaly exists, the system may thereafter notify a user of the anomaly. For example, the system may highlight the object in the drawing that is determined to be aberrant and/or describe why it arrived at that determination. Additionally or alternatively, the system may present a factually correct image that does not comprise any anomalies. Additionally or alternatively, the system may dynamically correct the user's own drawing by adding, removing, or otherwise adjusting objects to the drawing contextually appropriate.

Such a system provides a technical improvement over current techniques for critiquing user drawing input. More particularly, rather than relying on a single human instructor, one or more users may be able to substantially simultaneously take advantage of the drawing analysis capabilities of the system to critique their drawing input. Such a system allows users to receive immediate feedback regarding their drawing creations. Additionally or alternatively, the embodiments of the system described herein are capable of being utilized time-independent of when the instructor is working.

FIG. 1 illustrates a system and method for analyzing a user's drawing input to determine whether there are any factual anomalies present. At 101, the system may detect drawing input. In the context of this application, drawing input may refer to virtually any type of artistic scene that is constructed by a user or a machine (e.g., a scene creation application, etc.). For example, the drawing input may correspond to a physical or digital painting, sketch, doodle, and the like. Physical drawings may first be created in the real world and then an image of which may thereafter be captured and transferred to the system for analysis. Conversely, digital drawings may be created directly on a device comprising the system (e.g., using a painting or drawing application via a capacitive display screen, etc.).

At 102, the system may identify at least one object in the drawing input. In the context of this application, an object may refer to virtually any type of object a user may create (e.g., virtually any type of animate or inanimate object such as a person, animal, plant, structure, etc.). The identification may be conducted using one or more conventional image analysis techniques commonly utilized in the art. Additionally or alternatively, the system may have access to commonsense context data (e.g., stored in a local database, stored at a remote location, etc.) that may be utilized to identify objects in the drawing input. The system may identify objects as the drawing is being created or, alternatively, may only conduct the identification process once the drawing is deemed to be complete. Additionally or alternatively, the commonsense context database may be dynamically updated with identified characteristics of a user's drawing inputs. More particularly, as an example, the system may be able to identify certain characteristics of a particular user drawn object, e.g., a tree. The system may then subsequently be able to identify similar objects by monitoring for these characteristics.

At 103, the system may determine whether a factual anomaly exists in the drawing based at least in part on the objects identified in the drawing. In the context of this application, the factual anomaly may refer to one or more attributes (e.g., size, color, position, etc.) of one or more drawn objects that do not align with a context of the drawing. In the system, the determination may be conducted, for example, by first identifying the context associated with the drawing. In one situation, the context may be identified by identifying the objects and/or the object attributes in the drawing. For example, the system may identify that the drawing comprises a plurality of animals arranged in line with one another. In another situation, the context may be identified by additionally examining the verbiage of the instructional prompt. For example, a user may be provided with an instructional prompt to construct a particular scene that comprises a plurality of different animals, where each animal is illustrated at a different depth than the others.

Once the context is identified, the system may determine whether the attributes of the objects are compatible with the context. This determination may be facilitated by accessing the available commonsense context data, which may comprise information related to the relative/absolute properties of the objects such as the conventional appearance (i.e., shape) of certain objects, the conventional size of certain objects with respect to each other, the conventional color of certain objects, etc. The commonsense context database may be frequently updated with new and relevant information that the system may continuously access and extract facts from. For example, a system may first detect that a user has drawn three animals and then identify (e.g., by comparing the drawn animals to the commonsense context database comprising information related to the proper appearances of drawn animals, etc.) the actual animal that each drawing is a representation of. Thereafter, the system may determine whether each animal drawing is accurately rendered. For instance, the system may determine, based on the identified context, whether each animal is realistically sized with respect to other drawn animals or objects, whether the drawn animals contain the correct coloring, whether the drawn animals have the correct positioning or exhibit the correct emotion or action based on an instructional prompt, etc. The system may also determine whether extraneous objects are present in the image or that necessary objects or effects are absent from the image. If the system determines that the attributes of the object(s) are not factually compatible with the context, the system may conclude that a factual anomaly exists.

The determination of factual anomalies in a drawing may be judged based upon predetermined analysis settings. More particularly, each user may be judged under a different standard. For example, it may be acceptable for a drawing created by a novice drawer to contain a greater number and greater severity of factual anomalies than a drawing created by an experienced drawer. Accordingly, each user, or each drawing, may be associated with a particular standard setting. The standard setting may define the degree of scrutiny that the drawing is judged under.

Responsive to determining, at 103, that the image does not contain a factual anomaly, the system may, at 104, take no additional action. Additionally or alternatively, the system may generate a positive notification indicating that the image is factually correct. Conversely, responsive to determining, at 103, that the image contains at least one factual anomaly, the system may, at 105, notify a user that a factual anomaly exists.

The notification may simply apprise a user that an anomaly exists. For example, the notification may be visual, audible, haptic, a combination thereof, etc. that informs the user that their drawing comprises an anomaly. In another situation, the notification may highlight the particular object, or portion of the object, that is factually aberrant. For example, the system may visually distinguish the factually aberrant object from other objects in the drawing (e.g., by circling it, by highlighting the object in a particular color, etc.) or may explain, in words, which object is factually aberrant. Additionally or alternatively, the system may explain why the object is factually aberrant (e.g., because it is unrealistically large compared to other objects in the drawing, because it is not filled in with the correct color, because it is in the wrong position, etc.). The foregoing notification techniques may be used alone or in combination.

Additionally or alternatively, the system may present the user with a factually correct drawing. For example, responsive to identifying that an object in the drawing is unrealistically big compared to other identified objects in the drawing, the system may present the user with an alternative drawing where the object-at-issue is appropriately sized. As another example, responsive to identifying that unnecessary objects are present in the drawing or that the drawing does not contain necessary objects, the system may present a factually correct drawing in which the extraneous objects are removed or in which the necessary objects are introduced. In another example, if the user's drawing was created in response to an instructional prompt, the system may access and present a factually correct drawing that corresponds with the instructional prompt to the user. For all of the above, Generative Adversarial Networks (GANs) may be utilized to compose an image by blending or superimposing an object on an image and/or spatially transforming the object or its surrounding or manipulating its attributes in order to make the target image more realistic. Specifically, with respect to object insertion, Gaussian-Poisson GAN (GP-GAN) may be utilized for realistic high-resolution image blending, Spatial Transformer GAN (ST-GAN) may be utilized for image compositing, and Composite GAN (C-GAN) may be utilized for part-by-part image generation. With respect to object removal or image inpainting, Deep Convolutional GAN (DC-GAN) may be utilized.

The system may also perform one or more additional actions responsive to conducting the drawing analysis. For example, the system may dynamically assign a grade to the drawing based upon the plurality and/or the severity of the factual anomalies that were detected. As another example, the system may dynamically rank a user by the quality of their drawing and/or by the ability of the user to follow instructions. Such a ranking may be used to better inform a user what their capabilities are and/or to better place the user in the appropriate course that they will benefit the most from. In yet another example, the underlying system may be used in one or more user authorization techniques. For example, prior to granting a user access to an application or to specific content, the system may query the user to draw a predetermined image. Responsive to identifying that the objects in the image are drawn to a predetermined standard, the system may grant the user access to requested content.

A plurality of non-limiting example implementations of the foregoing anomaly detection and notification techniques are described below.

Figure 2:
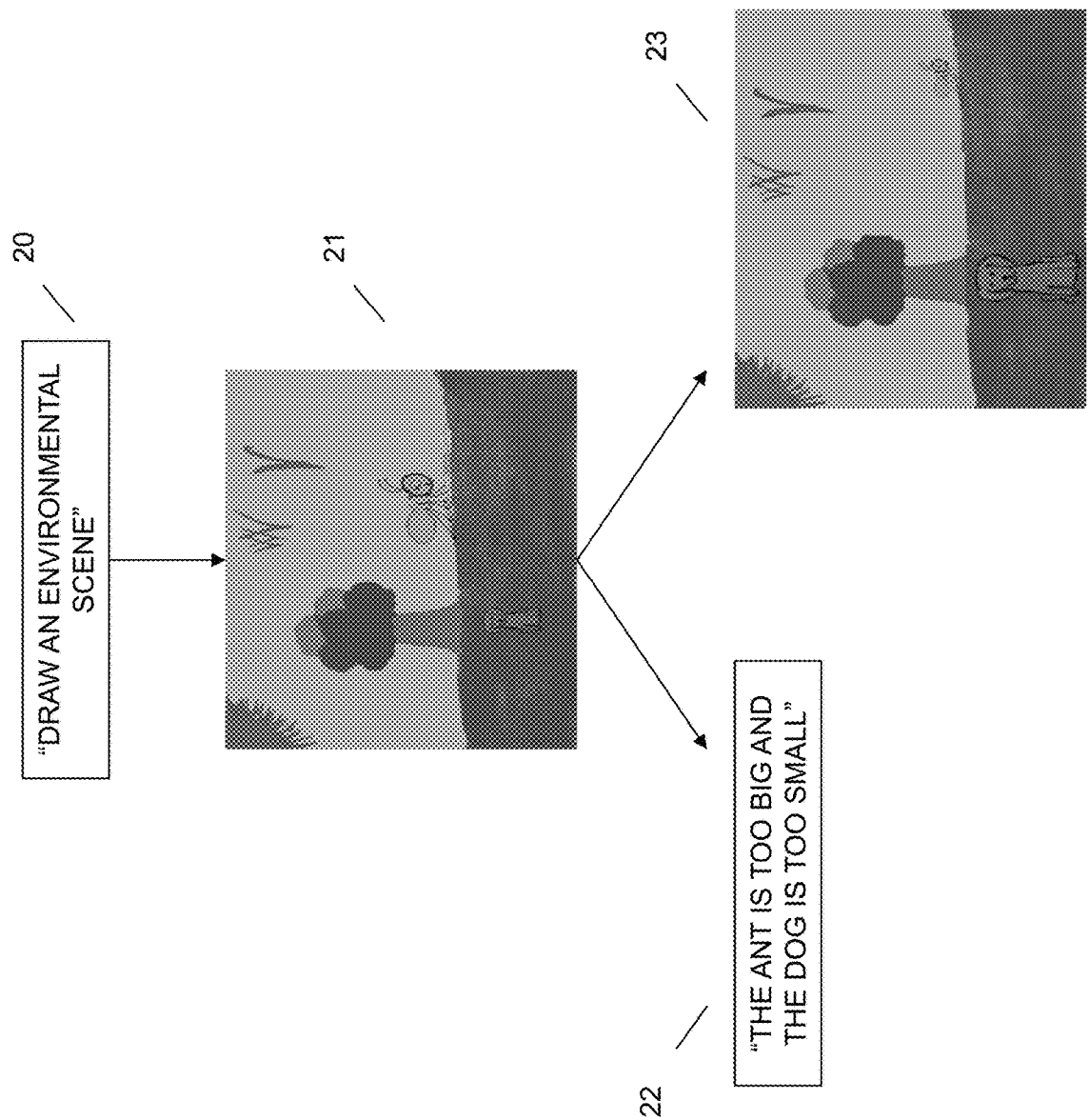
FIG. 2 illustrates an example drawing analysis process and result.

Referring now to FIG. 2, a system may provide an open-ended prompt 20 that instructs a user to paint a scenery 21. The scenery 21 may contain a tree, birds, the sun, an ant, and a dog. The system may determine, using the aforementioned techniques, that anomalies exists with the ant and/or the dog. More particularly, the system may identify that the ant is abnormally large and/or that the dog is abnormally small compared to the other objects in the scenery 21. The system may then notify, at 22, the user of the anomaly and/or provide the user with a factually correct image 23 that includes a properly sized ant and/or dog.

Figure 3:
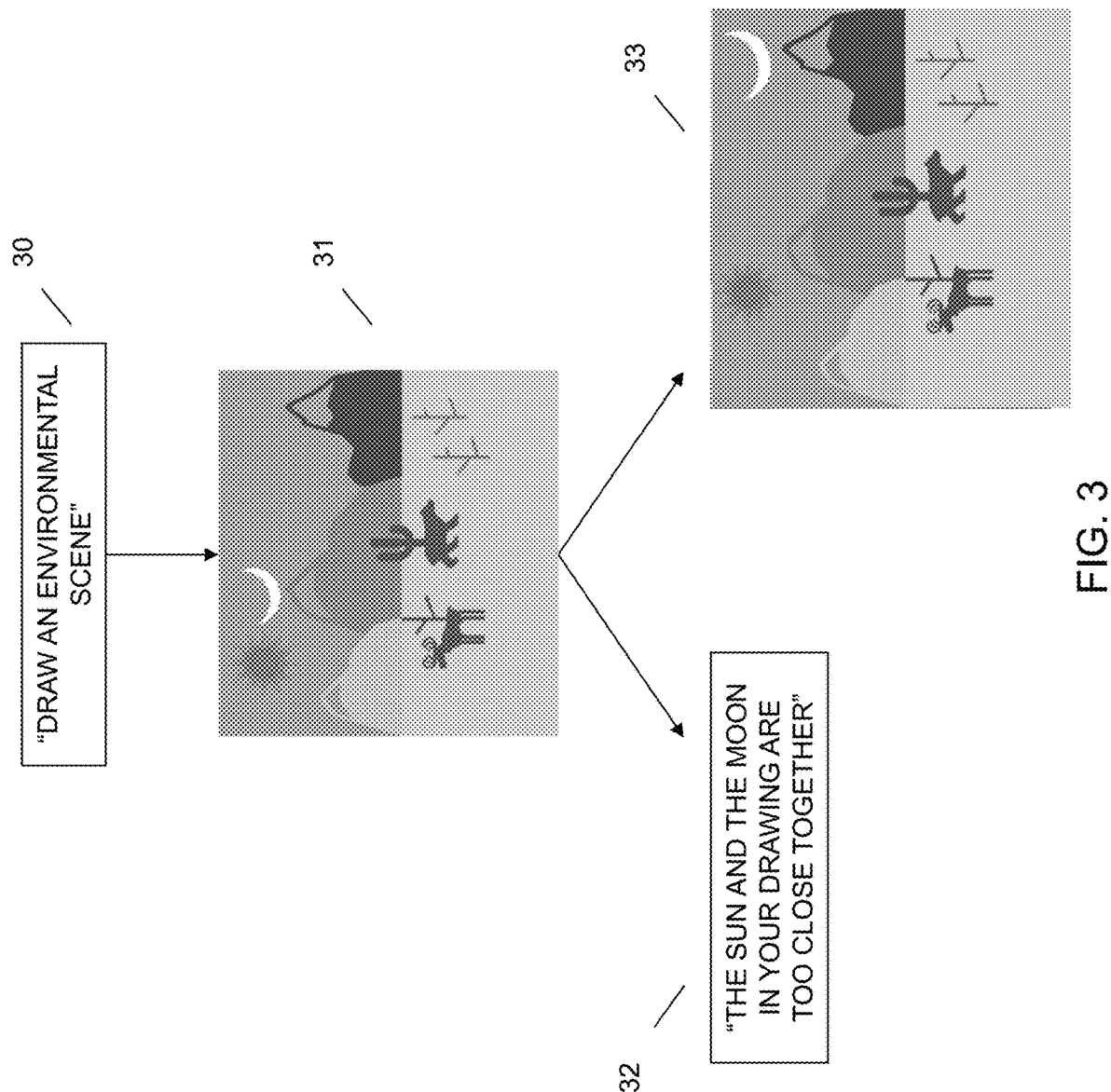
FIG. 3 illustrates another example drawing analysis process and result.

Referring now to FIG. 3, a system may provide an open-ended prompt 30 that instructs a user to paint a scenery 31. The scenery 31 may contain a moose, a bear, trees, mountains, a sun, and a moon. The system may determine, using the aforementioned techniques, that an anomaly exists between the sun and the moon. More particularly, the system may identify that the sun and the moon are positioned inappropriately close to each other. Responsive to this identification, the system may explain this anomaly to the user in a notification 32 and/or may provide the user with a factually correct image 33 that includes the correct positioning of the sun and the moon.

Figure 4:
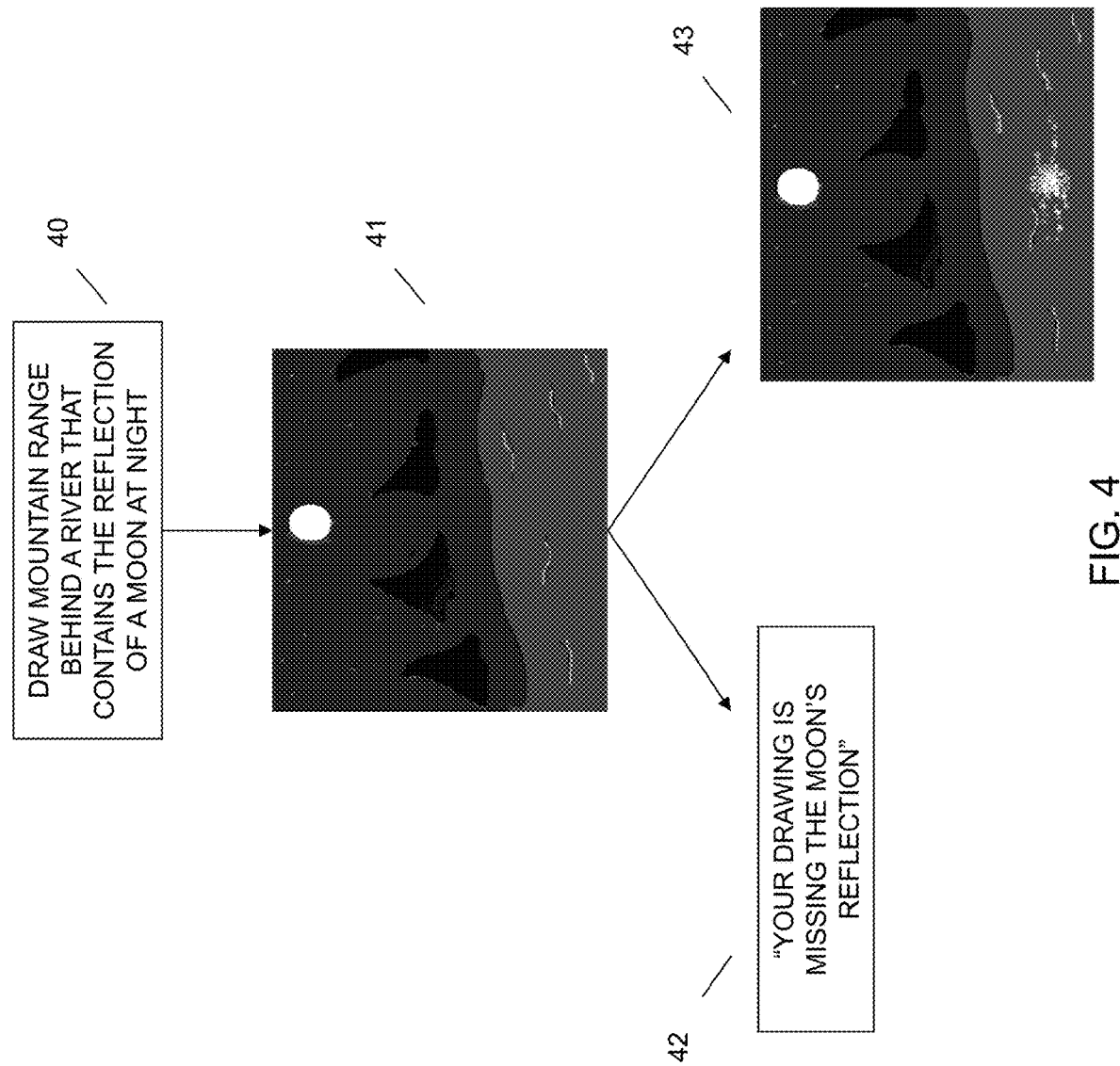
FIG. 4 illustrates another example drawing analysis process and result.

Referring now to FIG. 4, a system may provide a user with an instructional prompt 40 to construct a drawing with some specific features. More particularly, the prompt 40 may direct the user to draw a mountain range positioned behind a river, on which the moon's light beams are reflected at night. As can be seen from the drawn image 41, the user has neglected to include the moon's reflection in the river. Accordingly, the system may identify the absence of this critical feature and explain the absence of the feature to the user in a notification 42 and/or may provide the user with a factually correct image 43 that comprises the moon's reflection.

Thus, the described system and method provide a significant technical improvement to conventional drawing analysis and critiquing techniques. More particularly, as opposed to conventional techniques that require examination of a user's drawing by a human individual, the described system can identify objects in a user's drawn image and thereafter determine whether any factual anomalies exist with the objects. Responsive to determining that the anomalies exist, the system may notify the user of these anomalies so that they may be corrected. The notification may include the presentation of a factually correct drawing in which the factually aberrant objects were removed, added, or corrected. Such a system may perform the analysis and critique very quickly and may perform the described processes on multiple drawings substantially simultaneously. Thus, the described drawing analysis system is more efficient and represents a more convenient and more accessible analysis tool than conventional systems.

Figure 5:
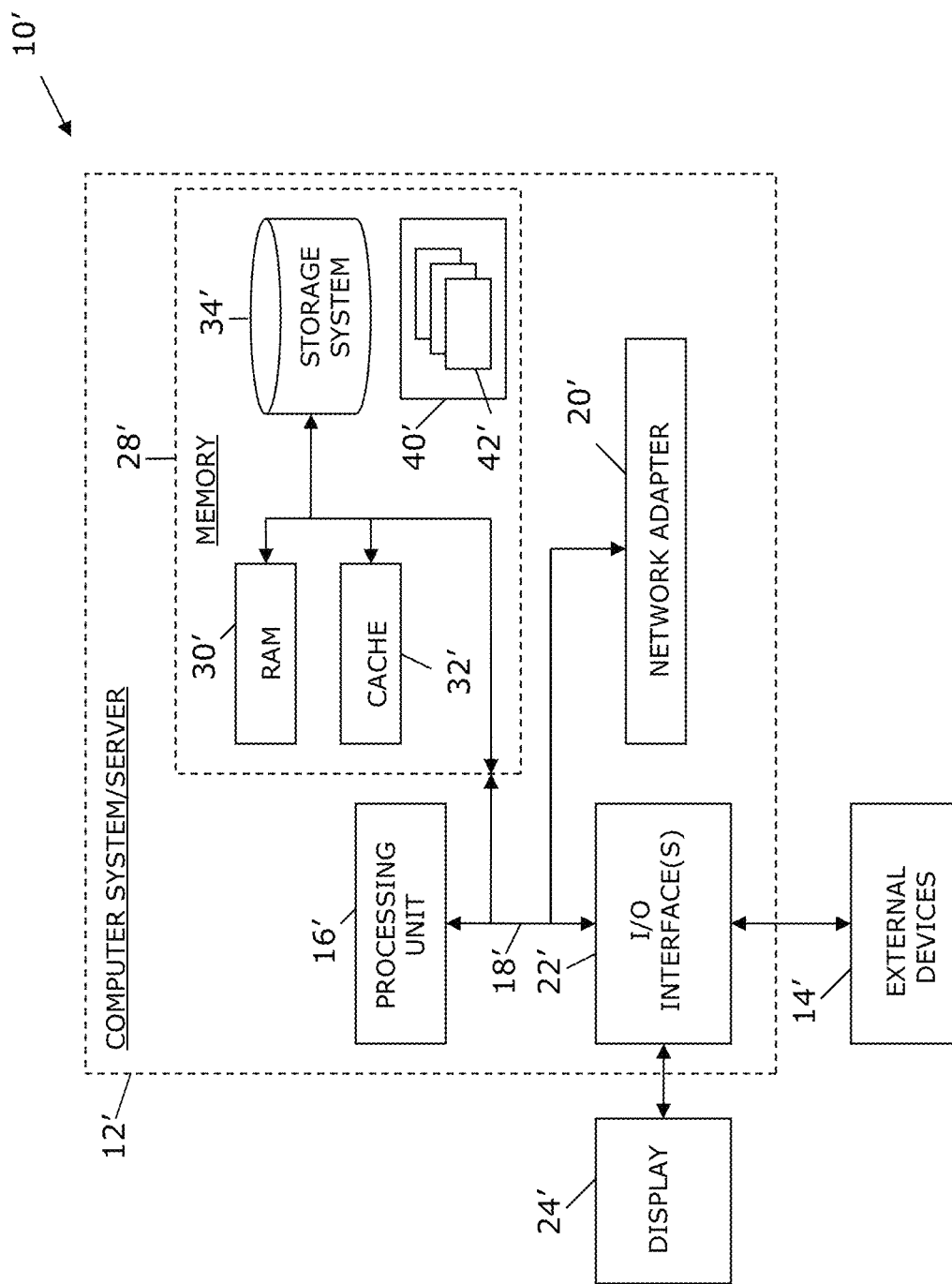
FIG. 5 illustrates a computer system.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
  receiving, at an information handling device, drawing input from a user;
  identifying, using a processor, at least one object in the drawing input;
  determining, based on the identifying, that a factual anomaly exists in the drawing input with respect to the at least one object, wherein the determining comprises identifying a context associated with the drawing input, accessing commonsense context data within a commonsense context database and comprising information related to attributes of the at least one object in view of the context, and comparing attributes of the at least one object to the attributes within the commonsense context data and attributes of other drawing input within the drawing input, wherein the commonsense context database is updated responsive to identifying new information;
  assigning a grade to the drawing input based upon at least one of: a number of existing factual anomalies and a severity of the existing factual anomalies, wherein the grade is based upon a predetermined analysis setting having an identified judging standard, wherein the identified judging standard defines a degree of scrutiny for the drawing input and is, at least in part, based upon a skill level of the user; and notifying, responsive to determining that a factual anomaly exists, the user of the factual anomaly and the grade.

2. The method of claim 1, wherein the drawing input corresponds to a drawing created by the user.

3. The method of claim 1, wherein the factual anomaly is associated with at least one anomaly selected from the group consisting of size of the at least one object, color of the at least one object, position of the at least one object, and an effect of the at least one object.

4. The method of claim 1, wherein the determining comprises:

comparing an attribute of the at least one object in the drawing input to an attribute of another object in the drawing input; and determining, based on the comparison, whether the attribute of the at least one object is factually compatible with the context.

5. The method of claim 1, wherein the notifying comprises explaining why the factual anomaly exists.

6. The method of claim 1, wherein the notifying comprises suggesting an adjustment to an attribute of the at least one object to eliminate the factual anomaly.

7. The method of claim 1, wherein the notifying comprises presenting a factually correct image that does not comprise the factual anomaly.

8. The method of claim 7, wherein the presenting the factually correct image comprises at least one of: removing an object from the drawing input, adding an object to the drawing input, and adjusting an attribute of the at least one object.

9. The method of claim 1, wherein the grade is based at least in part on drawing capability standard assigned to the user.

10. An apparatus, comprising:

at least one processor; and a computer readable storage medium having computer readable program code embodied therewith and executable by the at least one processor, the computer readable program code comprising:

computer readable program code configured to receive drawing input;

computer readable program code configured to identify at least one object in the drawing input;

computer readable program code configured to determine, based on the identifying, that a factual anomaly exists in the drawing input with respect to the at least one object, wherein the determining comprises identifying a context associated with the drawing input, accessing commonsense context data within a commonsense context database and comprising information related to attributes of the at least one object in view of the context, and comparing attributes of the at least one object to the attributes within the commonsense context data and attributes of other drawing input within the drawing input, wherein the commonsense context database is updated responsive to identifying new information;

computer readable program code configure to assign a grade to the drawing input based upon at least one of: a number of existing factual anomalies and a severity of the existing factual anomalies, wherein the grade is based upon a predetermined analysis setting having an identified judging standard, wherein the identified judging standard defines a degree of scrutiny for the drawing input and is, at least in part, based upon a skill level of the user; and computer readable program code configured to notify, responsive to determining that a factual anomaly exists, the user of the factual anomaly and the grade.

11. A computer program product, comprising:

a computer readable storage medium having computer readable program code embodied therewith, the computer readable program code executable by a processor and comprising:

computer readable program code configured to receive drawing input;

computer readable program code configured to identify at least one object in the drawing input;

computer readable program code configured to determine, based on the identifying, that a factual anomaly exists in the drawing input with respect to the at least one object, wherein the determining comprises identifying a context associated with the drawing input, accessing commonsense context data within a commonsense context database and comprising information related to attributes of the at least one object in view of the context, and comparing attributes of the at least one object to the attributes within the commonsense context data and attributes of other drawing input within the drawing input, wherein the commonsense context database is updated responsive to identifying new information;

computer readable program code configure to assign a grade to the drawing input based upon at least one of: a number of existing factual anomalies and a severity of the existing factual anomalies, wherein the grade is based upon a predetermined analysis setting having an identified judging standard, wherein the identified judging standard defines a degree of scrutiny for the drawing input and is, at least in part, based upon a skill level of the user; and computer readable program code configured to notify, responsive to determining that a factual anomaly exists, the user of the factual anomaly and the grade.

12. The computer program product of claim 11, wherein the factual anomaly is associated with at least one anomaly selected from the group consisting of a size of the at least one object, a color of the at least one object, a position of the at least one object, and an effect of the at least one object.

13. The computer program product of claim 11, wherein the determining comprises:

identifying a context associated with the drawing input;

comparing an attribute of the at least one object in the drawing input to an attribute of another object in the drawing input; and determining, based on the comparison, whether the attribute of the at least one object is factually compatible with the context.

14. The computer program product of claim 11, wherein the notifying comprises explaining why the factual anomaly exists.

15. The computer program product of claim 11, wherein the notifying comprises suggesting an adjustment to an attribute of the at least one object to eliminate the factual anomaly.

16. The computer program product of claim 11, wherein the notifying comprises presenting a factually correct image that does not comprise the factual anomaly.

17. The computer program product of claim 16, wherein the presenting the factually correct image comprises at least one of: removing an object from the drawing input, adding an object to the drawing input, and adjusting an attribute of the at least one object.

18. The computer program product of claim 11, wherein the grade is based at least in part on drawing capability standard assigned to the user.

19. A method, comprising:

providing, to a user by means of an information handling device, an instructional prompt to create a drawing, wherein the instructional prompt specifies at least one object to be included in the drawing and at least one attribute associated with the at least one object;

receiving, at the information handling device and responsive to the providing, drawing input from the user;

determining, using a processor, that a factual anomaly exists in the drawing input, wherein the determining comprises determining whether the drawing input contains the at least one object and whether the at least one object comprises the at least one attribute, wherein the determining further comprises identifying a context associated with the drawing input, accessing commonsense context data within a commonsense context database and comprising information related to attributes of the at least one object in view of the context, and comparing attributes of the at least one object to the attributes within the commonsense context data and attributes of other drawing input within the drawing input, wherein the commonsense context database is updated responsive to identifying new information;

assigning a grade to the drawing input based upon at least one of: a number of existing factual anomalies and a severity of the existing factual anomalies, wherein the grade is based upon a predetermined analysis setting having an identified judging standard, wherein the identified judging standard defines a degree of scrutiny for the drawing input and is, at least in part, based upon a skill level of the user;

automatically adjusting, responsive to determining that a factual anomaly exists, the drawing input to a factually correct drawing; and presenting the automatically adjusted drawing input to the user along with the grade for the drawing input.

\* \* \* \* \*